(12) United States Patent
Butz et al.

(10) Patent No.: US 6,484,915 B2
(45) Date of Patent: Nov. 26, 2002

(54) TRANSPORT CONTAINER HOLDER FOR A MOTOR VEHICLE, FOR EXAMPLE IN A PASSTHROUGH TO THE TRUNK

(75) Inventors: Peter Butz, Hamburg (DE); Wolfgang Sitzler, Wuppertal (DE)

(73) Assignee: Peter Butz GmbH & Co. Verwaltungs-KG, Langenfeld (DE)

( * ) Notice: Subject to any disclaimer, the term of this patent is extended or adjusted under 35 U.S.C. 154(b) by 75 days.

(21) Appl. No.: 09/797,418

(22) Filed: Mar. 1, 2001

(65) Prior Publication Data

US 2002/0121536 A1 Sep. 5, 2002

(51) Int. Cl.$^7$ .................................................. B60R 5/00
(52) U.S. Cl. ...................................................... 224/539
(58) Field of Search ................................ 224/543, 539, 224/544, 545, 546, 555, 557; 297/113, 188.01, 188.02, 188.04, 188.09, 188.2; 296/37.16, 37.1

(56) References Cited

U.S. PATENT DOCUMENTS

| | | | |
|---|---|---|---|
| 4,973,017 A | * 11/1990 | Takagi | 248/292.13 |
| 5,628,543 A | 5/1997 | Filipovich | |
| 6,199,948 B1 | * 3/2001 | Bush et al. | 297/188.04 |
| 6,213,546 B1 | * 4/2001 | Malusev et al. | 297/113 |

* cited by examiner

Primary Examiner—Gregory M. Vidovich
Assistant Examiner—Maerena W. Brevard
(74) Attorney, Agent, or Firm—Herbert Dubno; Andre Wilford

(57) ABSTRACT

A transport container holder has a holding frame which is releasably engaged in a fastening frame forming a passthrough to the trunk of a motor vehicle. An actuating member pulls the tractive element which engages a pair of locking bars on opposite limbs of the fastening frame against springs which are attached at the other ends of the locking bar so that pins of the locking bars release the holding frame.

9 Claims, 4 Drawing Sheets

TRANSPORT CONTAINER HOLDER FOR A MOTOR VEHICLE, FOR EXAMPLE IN A PASSTHROUGH TO THE TRUNK

FIELD OF THE INVENTION

Our present invention relates to a transport container holder for use in a motor vehicle which can have a passthrough, especially to the trunk and can be provided in the position of an arm rest or otherwise in a seating structure, for example, for a ski bag.

BACKGROUND OF THE INVENTION

In German patent document DE 197 27 500 A1, a transport container holder for a motor vehicle is provided in the seating structure or back wall of the vehicle trunk in association with a passthrough enabling, for example, a ski bag to be readily transported.

In the system of DE 197 27 500, a fastening frame is mounted in the vehicle and engages a holding frame of the container module utilizing a latch mechanism operated by an actuating member. The latch structure of that system was relatively complex.

OBJECTS OF THE INVENTION

It is the principal object of the present invention to provide a transport container holder for the purposes described and in applications as has been described for the prior art transport container holder which has a simpler latch structure.

Another object of this invention is to provide an improved transport container holder which facilitates removal and securing of the container module, increases the versatility of such systems and is free from drawbacks of prior art systems.

SUMMARY OF THE INVENTION

These objects and others which will become apparent hereinafter are attained, in accordance with the invention, by providing a guide on the fastening frame in which a locking element, preferably a locking bar, is moveable and which at one end is connected with a tension spring and at the opposite end with a tractive element, e.g. a wire or cable.

According to the invention the tractive member, which is held under tension by the spring, is pressed between its ends by the actuating member to draw the bar into its position in which the container module is released. The actuating member is thus moved in a direction transverse to the longitudinal dimension of the tractive element.

According to a feature of the invention, the opposite longitudinal limbs of the fastening frame are provided with respective guide channels receiving the latch bars and their pins which can extend through elongated slots in these limbs. The tractive element, cable or wire connects ends of these bars while respective tension springs engage opposite ends thereof.

A key advantage of the invention is that the actuating arrangement itself is greatly simplified by comparison with the earlier system since a simple transverse displacement of the cable or wire can effect the necessary linear displacement of the locking bar. Of course, the locking bar can be rotatable rather than translatable and the locking formation can be a male or female formation with the counter-locking element on the holding frame being a female or male formation.

More particularly, the transport container holder of the invention capable of incorporation in the vehicle seat or trunk wall structure can comprise:

a fastening frame having a throughgoing opening forming a passthrough into a trunk of a vehicle;

a holding frame of a container positionable on and removable from the fastening frame;

a locking element movable in a guide on the fastening frame and provided with a formation engageable with the holding frame for releasably retaining the holding frame on the fastening frame;

a spring engaged with one side of the locking element for applying a spring force thereto;

a tractive element engaged at one end with another side of the locking element and maintained under tension by the spring force; and an actuating member acting on the tractive element between ends thereof for drawing the locking element against the spring force into a position wherein the holding frame is released by the formation.

BRIEF DESCRIPTION OF THE DRAWING

The above and other objects, features, and advantages will become more readily apparent from the following description, reference being made to the accompanying drawing in which.

SPECIFIC DESCRIPTION

A fastening frame for a transport container device, for example a ski tote bag passthrough unit or a passthrough unit with an inserted module 33, has a flange portion 11 and a frame portion 12. Reference may be had to U.S. Pat. No. 5,628,543 which illustrates the principles of a passthrough device accommodating a ski bag.

Figure 1:
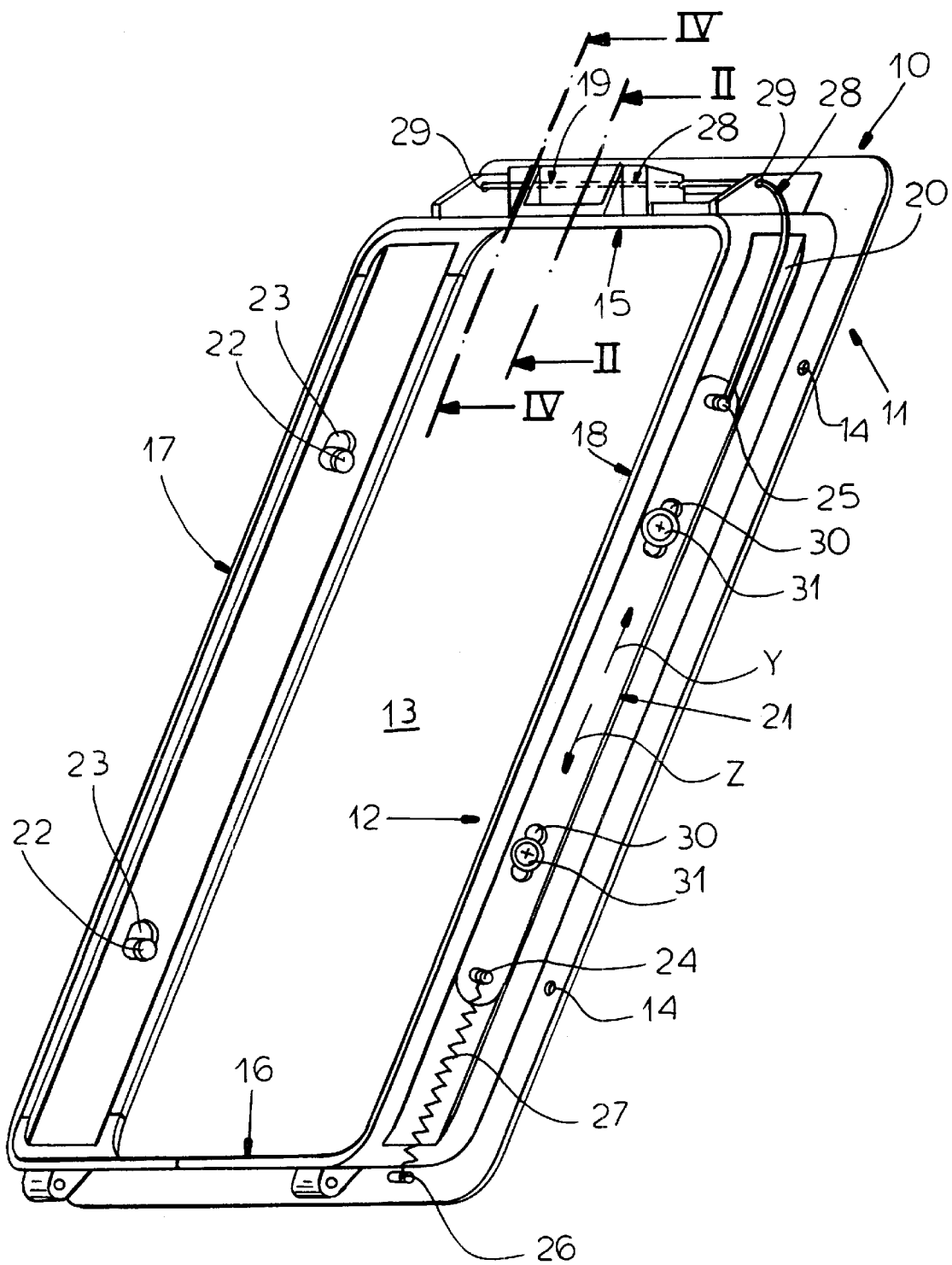
FIG. 1 is a perspective view, partly distorted to show surfaces which might not otherwise be visible, of a fastening frame for the device of the invention.

The frame portion 12 surrounds a frame opening 13. The flange portion 11 is provided with fastening holes 14 enabling it to be affixed to the trunk wall around a throughgoing opening therein which is aligned substantially with the frame opening 13. The frame opening 12 has an upper frame limb 15, a lower frame limb 16 and two mutually parallel longitudinal frame limbs 17 and 18. Along outer flanks of the longitudinal frame limbs 17 and 18 respective guide grooves 20 are formed which serve to allow linear displacement (translation) of respective locking bars 21 each of which carries two locking pins 22 whose free ends project inwardly toward the frame opening 13. The locking pins 22 pass through elongated holes 23 of the longitudinal frame limbs 17 and 18. The long axes of the elongated holes 23 extend parallel to the directions y and z of the movement of the locking bars 21 and hence of the locking pins 22. Each locking bar 21 has a lower and an upper retaining pin 24, 25. The flange portion 11 of the fastening frame 10 has two anchor pins 26 of which only one is visible in FIG. 1. Between the lower retaining pin 24 and the respective anchor pin 26 a respective tension spring 27 extends. Each of the upper retaining pins 25 of the bars 21 is connected to a traction element which is preferably a wire cable 28 connecting the pins 25 together.

The cable 28 is guided in the frame portion 12 of the fastening frame 10 across the upper shank 15 thereof, e.g. in holes 29 and is maintained under tension by the tension springs 27. To guide and position the two locking bars 21, each of these locking bars are provided with two elongated holes 30 with longitudinal axes extending in the directions of movement y and z and through which fastening screws 31 engage to hold the locking bars against the respective limbs 17 and 18. The screws 31 are so dimensioned and arranged that, while holding the locking bars against the limbs 18 and 19, they allow the longitudinal linear movement of those bars. The holder frame 32 is part of the rigid container module which has been represented at 33 and which has female locking formations in the form of locking holes 34 which have semicircular locking regions 35 and a funnel-shaped entry region 36 leading to the locking regions 35 (see especially FIG. 2).

Figure 2:
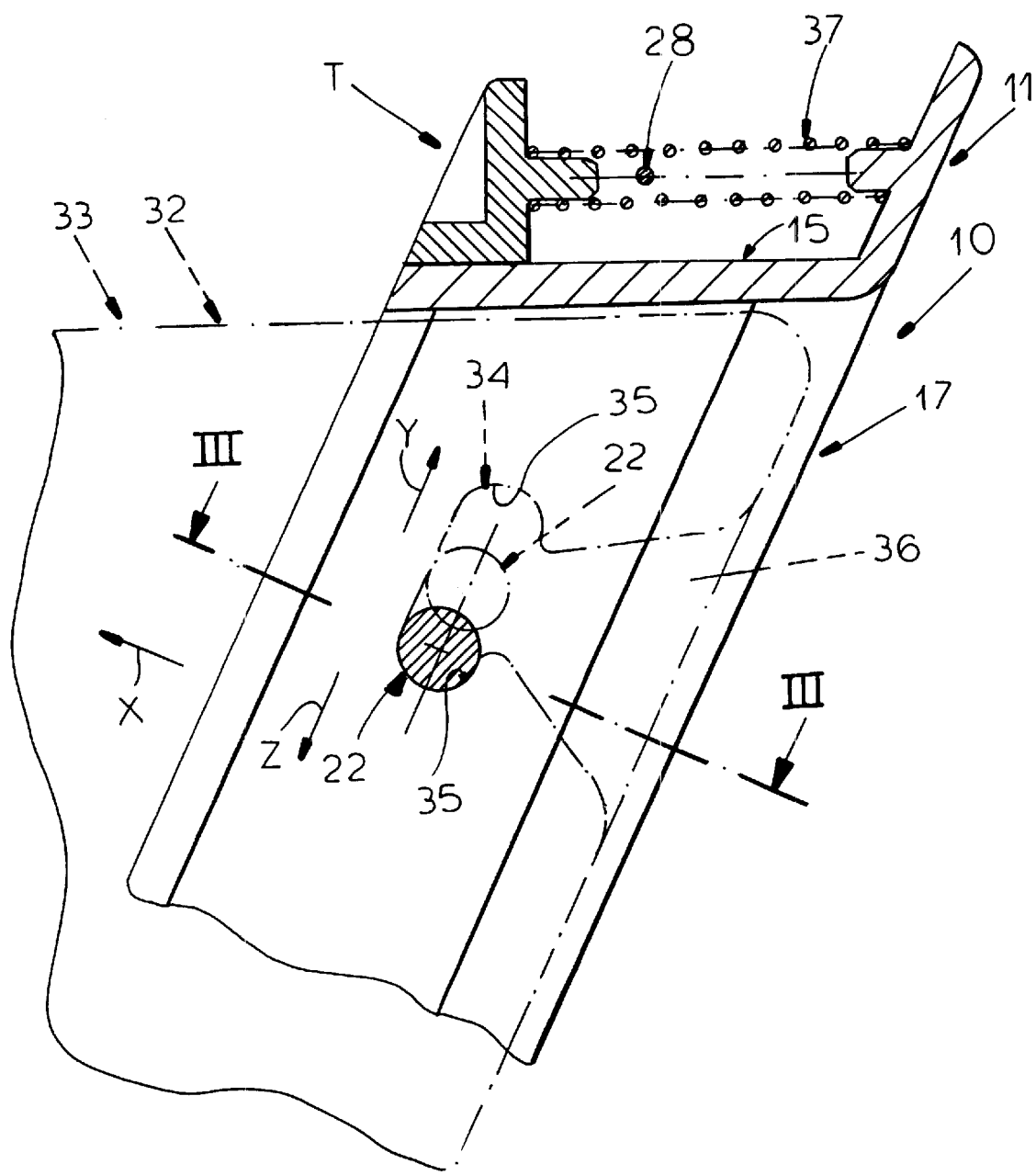
FIG. 2 is a section taken along the line II—II of FIG. 1 wherein part of the contour of the holder frame is shown in broken lines.
Figure 4:
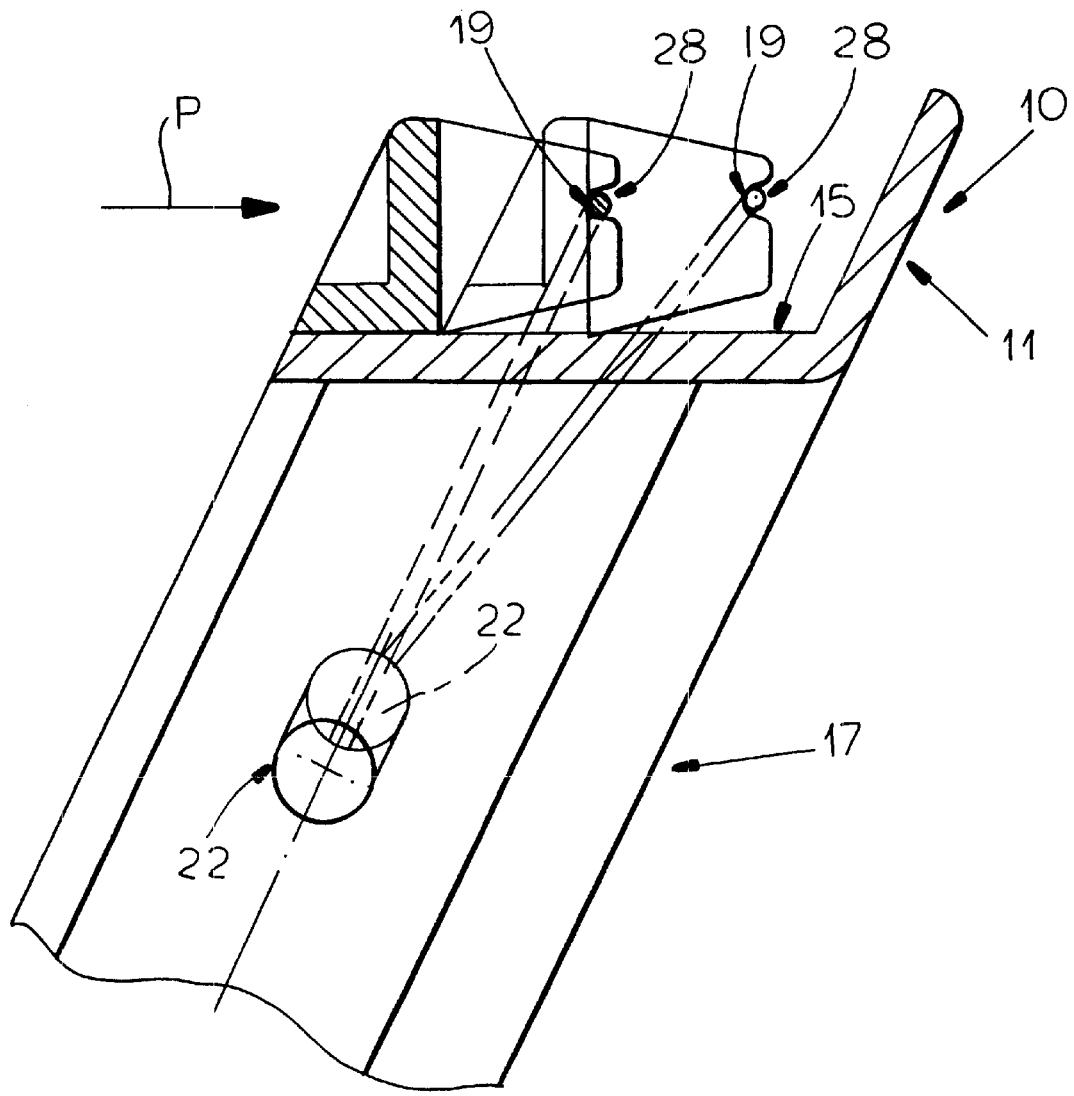
FIG. 4 is a cross sectional view taken along the line IV—IV of FIG. 1.

When an actuating button T is pressed against the restoring force of a coil spring 37 (FIG. 2) with an actuating pressure P (FIG. 4) and entrains the region 19 of the cable 28 to the right (FIG. 4)., the cable 28 pulls the pins 22 via the locking bars 21 upwardly (light-line and broken-line position shown in FIG. 4). and thus pulls the pins 22 into the broken line position shown in FIG. 2 in which the container 33 can be removed in the dismounting direction x.

Figure 3:
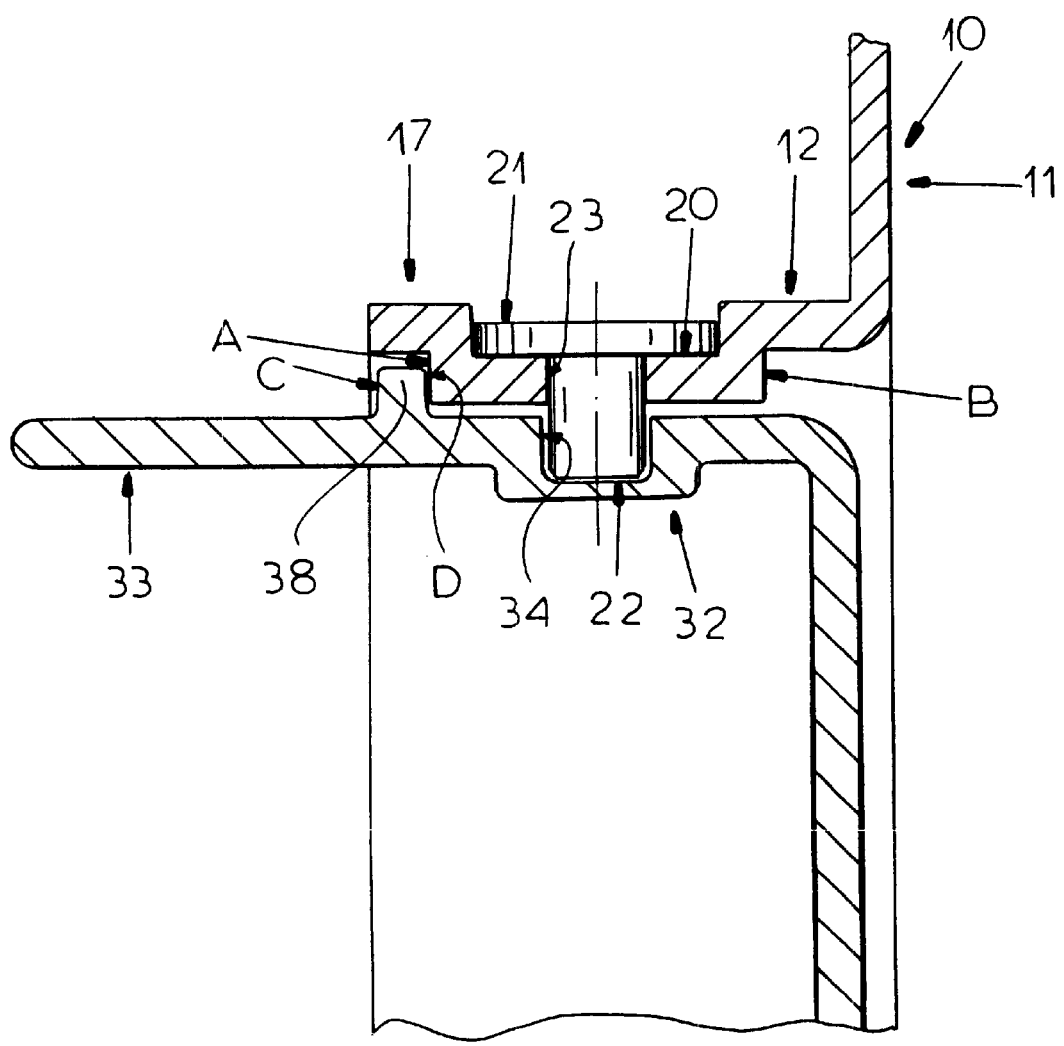
FIG. 3 is a cross sectional view taken along the line III—III through the fastening frame and the holder frame of FIG. 2.

From FIG. 3 it will be apparent that the fastening frame 10 has respective abutment surfaces A and B which can be engaged by the abutment surfaces C and D of an abutment bar or rib 38 of the module 33. It will thus be apparent that the container module 33 with its holding frame 32 can be fastened to the frame 10 from the right or the left thanks to the symmetrical arrangement of the locking holes 34 of FIG. 2 and even can be releasably inserted in an overhead arrangement in the fastening frame 10.

We claim:

1. A transport container accessory for incorporation in a vehicle seat or trunk wall structure, comprising:
    a fastening frame having a throughgoing opening forming a passthrough into a trunk of a vehicle;
    a holding frame of a container positionable on and removable from said fastening frame;
    a locking element movable in a guide on said fastening frame and provided with a formation engageable with said holding frame for releasably retaining said holding frame on said fastening frame;
    a spring engaged with one side of said locking element for applying a spring force thereto;
    a tractive element engaged at one end with another side of said locking element and maintained under tension by said spring force; and
    an actuating member acting on said tractive element between ends thereof for drawing said locking element against said spring force into a position wherein said holding frame is released by said formation.

2. The transport container accessory defined in claim 1 wherein said locking element is a bar linearly displaceable on said fastening frame.

3. The transport container accessory defined in claim 2 wherein said fastening frame is formed with a guide channel receiving said bar and confining said bar to translation on said fastening frame.

4. The transport container accessory defined in claim 3 wherein said bar has at least one locking pin constituting said formation and projecting through an opening in said fastening frame.

5. The transport container accessory defined in claim 2 wherein said fastening frame has a pair of longitudinal limbs each of which is formed with a guide channel for a respective locking bar, each of said locking bars being formed as a respective pin engageable with said holding frame and passing through an elongated hole in the respective limb, said hole having longitudinal axes extending in a direction of movement of the respective locking bar and pin.

6. The transport container accessory defined in claim 1 wherein said locking element is a locking bar connected at one end with said spring and at an opposite end with said tractive element.

7. The transport container accessory defined in claim 1 wherein said fastening frame is provided with respective locking bars forming said locking element in mirror-symmetrical relationship on opposite longitudinal sides of said fastening frame each of said locking bars being provided with respective tension springs applying said spring force thereto and each of said locking bars being connected to a respective end of said tractive element, said tractive element being a cable.

8. The transport container accessory defined in claim 7 wherein said locking bars are each provided with a pair of pins engageable with said holding frame.

9. The transport container accessory defined in claim 8 wherein said actuating member is displaceable against a compression spring force to entrain said cable between the ends thereof.

* * * * *